(12) United States Patent
Regula et al.

(10) Patent No.: US 7,039,750 B1
(45) Date of Patent: May 2, 2006

(54) ON-CHIP SWITCH FABRIC

(75) Inventors: Jack Regula, San Jose, CA (US); Jhy-Ping Shaw, San Jose, CA (US); Ronald A. Simmons, Bountiful, UT (US); Curtis Winward, Lehi, UT (US); Ralph Woodard, Mountain View, CA (US); William Wu, Cupertino, CA (US)

(73) Assignee: PLX Technology, Inc., Sunnyvale, CA (US)

( * ) Notice: Subject to any disclaimer, the term of this patent is extended or adjusted under 35 U.S.C. 154(b) by 640 days.

(21) Appl. No.: 09/912,231

(22) Filed: Jul. 24, 2001

(51) Int. Cl.
*G06F 13/00* (2006.01)

(52) U.S. Cl. ...................... 710/317; 710/242

(58) Field of Classification Search ............... 370/431, 370/463, 230, 389, 412, 413, 414; 710/240, 710/241, 242, 243, 112, 316, 317; 716/18
See application file for complete search history.

(56) References Cited

U.S. PATENT DOCUMENTS

| 5,155,843 | A | | 10/1992 | Stamm et al. | |
| 5,546,391 | A | * | 8/1996 | Hochschild et al. | 370/413 |
| 5,964,845 | A | | 10/1999 | Braun et al. | |
| 6,460,174 | B1 | * | 10/2002 | Carey | 716/18 |
| 2001/0042147 | A1 | * | 11/2001 | Adams et al. | 710/100 |
| 2002/0159474 | A1 | * | 10/2002 | Apostol et al. | 370/463 |
| 2002/0181455 | A1 | * | 12/2002 | Norman et al. | 370/389 |

* cited by examiner

Primary Examiner—Rehana Perveen
Assistant Examiner—Clifford Knoll
(74) Attorney, Agent, or Firm—Swernofsky Law Group PC (57) ABSTRACT

A system for communication on a chip. The system includes an on-chip communication bus including plural tracks, and a plurality of stations that couple a plurality of on-chip components to the on-chip communication bus, whereby the plurality of on-chip components use the tracks to communicate. Each station preferably includes an initiator that requests permission to transmit outgoing data over a track to another station and that transmits the outgoing data, an arbiter that evaluates requests from other stations and selects a track on which to receive incoming data, and a target that receives the incoming data. The initiator can be connected to a grant multiplexor for selecting a grant line, with the grant multiplexor further including plural smaller multiplexors distributed across the chip. Likewise, the arbiter can be connected to a track multiplexor for selecting a track, with the track multiplexor further including plural smaller multiplexors distributed across the chip. Each station also can include a source queue for queuing outgoing data and a destination queue for queuing incoming data. Preferably, the queues are first-in-first-out registers. The source queue and the destination queue can serve to separate a first clock domain for the on-chip communication bus from a second clock domain for one of the plurality of on-chip components. More than one of the plurality of on-chip components can be coupled to the on-chip communication bus through one of the stations.

40 Claims, 8 Drawing Sheets

ON-CHIP SWITCH FABRIC

BACKGROUND OF THE INVENTION

1. Field of the Invention

This invention relates to on-chip communication. In particular, the invention relates to on-chip communication between plural on-chip components across a communication bus having plural tracks.

2. Description of the Related Art

Traditional integrated circuit chips, also known as computer chips, are dedicated to a single function, with the chips attached to one another at a circuit board level. However, the number and types of circuits that can be place on a computer chip has continued to advance at a rapid pace. It is now possible to include circuits for many different functions on a single chip to create a complete "system on a chip."

Designing systems on a chip can be daunting. In particular, providing for communication between different on-chip integrated components can be difficult. Furthermore, traditional design approaches tend not to be scalable to systems that involved increasing numbers of on-chip components.

Each function on multi-functional single chip is implemented by an independently operating module. To function, each module exchanges data with another module. These modules function as a data transfer pair. As the number of functions on a single chip increases, multiple data transfer pairs are needed to simultaneously transfer data. In a traditional time domain shared bus, only one data transfer pair can transfer data on the shared bus at any given time. Thus, in the event that multiple data transfer pairs need to simultaneously transfer data, only one pair can have access to the bus at a time and the other pairs must wait. In a switch fabric, each module has a communication path from itself to all other modules; and thus, if the target module is not currently engaged in a data transfer, it can accept data from an initiator without contention with other data transfers that may be simultaneously occurring.

SUMMARY OF THE INVENTION

Accordingly, what is needed is a system for providing simultaneous communication among on-chip integrated components. This system should be flexible enough to accommodate different types of components. The system also should allow for easy integration of the components. Furthermore, the system should be easily scalable—in terms of both bandwidth and connectivity—to provide communication between increasing numbers of integrated components.

The invention addresses the foregoing needs by providing a system that includes an on-chip communication switch fabric for use by on-chip components. Preferably, the system uses a zero-wait-state packet-based communication protocol. The primary reason for packet based data transfers is because any target may have multiple initiators desiring to transfer data to it at any given time. By using a zero-wait-state packet based data transfer, the initiator is forced to transfer data every clock cycle which maximizes the data transfer bandwidth to the target. A second reason is that by limiting the packet size, the arbiter must frequently re-arbit and grant the bus; this ensures that the bus will operate in accordance with the priority scheme that the arbiter is designed to implement. Each target and initiator have exactly the same interface signals and timing, greatly simplifying learning costs for chip developers. The system also preferably uses multiplexors for signal selection, with the multiplexors being constructed from plural smaller multiplexors that can be distributed across a chip. This feature allows the system to be spread out across a chip, facilitating scalability. Furthermore, in a preferred embodiment, the system can use a different clock domain from the components, allowing for greater flexibility in chip design. Each component, as well as the system, may be in an independent clock domain.

Accordingly, one embodiment of the invention is a system for communication on a chip. The system includes an on-chip communication bus including plural tracks, and a plurality of stations that couple a plurality of on-chip components to the on-chip communication bus. The plurality of on-chip components use the tracks to communicate. Preferably, the stations use a packet based communication protocol. Each component has a dedicated track which it can use to send information to any/all other components.

Example of on-chip components that can utilize the invention include, but are not limited to, a PCI bridge, a USB interface, and an I2C interface. Other examples include a UART interface, a DDR and/or SDRAM, an ethernet interface, a general I/O interface, and other components.

In a preferred embodiment, each station includes an initiator that requests permission to transmit outgoing data over a track to another station and that transmits the outgoing data, an arbiter that evaluates requests from other stations and selects a track on which to receive incoming data, and a target that receives the incoming data. The arbiter is constructed to receive requests of varying priorities and to grant access based upon those priorities. The initiator can be connected to a grant multiplexor for selecting a grant line, and the arbiter can be connected to a track multiplexor for selecting a track. In order to facilitate scalability, these multiplexors can be constructed from plural smaller multiplexors distributed across the chip. The plurality of tracks and multiplexors preferably implement a crossbar switch.

Each station can also include a source queue for queuing outgoing data and a destination queue for queuing incoming data. These queues preferably are first-in-first-out registers. The source queue and the destination queue can serve to separate a clock domain for the on-chip communication bus from clock domains for the plurality of on-chip components. Thus, components that run at different clock speeds can be more easily accommodated than in traditional systems.

In order to provide for even greater flexibility, more than one of the plurality of on-chip components can be coupled to the on-chip communication bus through one of the stations. This arrangement is particularly useful for connecting plural slower components to the bus, with the benefit that memory and routing resources can be conserved.

Each station also preferably includes or is connected to a watchdog circuit that determines if its station has gone offline. If a watchdog station determines that its station has gone offline, that watchdog station informs a controller connected to the system. The controller can then re-route or block communications to that station, thereby helping to prevent the offline station from interfering with normal communications between components across the system.

The invention also includes methods for performing the foregoing operations, as well as other embodiments of the invention.

This brief summary has been provided so that the nature of the invention may be understood quickly. A more complete understanding of the invention may be obtained by reference to the following description of the preferred embodiments thereof in connection with the attached drawings.

DESCRIPTION OF THE PREFERRED EMBODIMENT

Lexicography

Chip: An integrated circuit chip. Examples include, but are not limited to, a central processing unit, digital signal processing chip, memory manager, or complete "system-on-a-chip."

System-on-a-Chip: A chip that contains all circuits necessary for implementing a complete system, for example for a basic computer.

Component: A subset of circuits on a chip that perform a particular function or operation. Examples include, but are not limited to, a PCI (peripheral component interconnect) bridge, a USB (universal serial bus) interface, an I2C (inter-integrated-circuit) interface, a UART (universal asynchronous receiver transmitter) interface, a DDR (data direction register) and/or SDRAM (synchronous dynamic access memory), an ethernet interface, a general I/O (input/output) interface, and other circuits and interfaces. Components also can be referred to as peripherals.

Station: A port to an on-chip communication bus according to the invention.

Clock Domain: A subset of circuits or components that uses a common clock signal.

Packet-Based Protocol: A communication protocol in which data is sent in packets, typically along with header information for the data.

Split-Response Transaction: A two-stage operation that is split over two transactions, namely a request operation and a completion operation. In a split-response read transaction, a first station sends a read request to a second station. The second station responds to the read request command by initiating a read completion operation to write the requested data to the first station.

Head-of-Line Blocking: Blocking that occurs when transmission of data at the front of a source queue is delayed because it is intended for a station or component that is busy, thereby blocking transmission of data deeper in the source queue that is intended for a station or component that is not busy.

Queue: A register or memory that stores data while the data awaits transmission or other processing.

FIFO (First In First Out) Register: A register that orders data such that data is sent from the register in the order that the data was received by the register.

Overview

Figure 1:
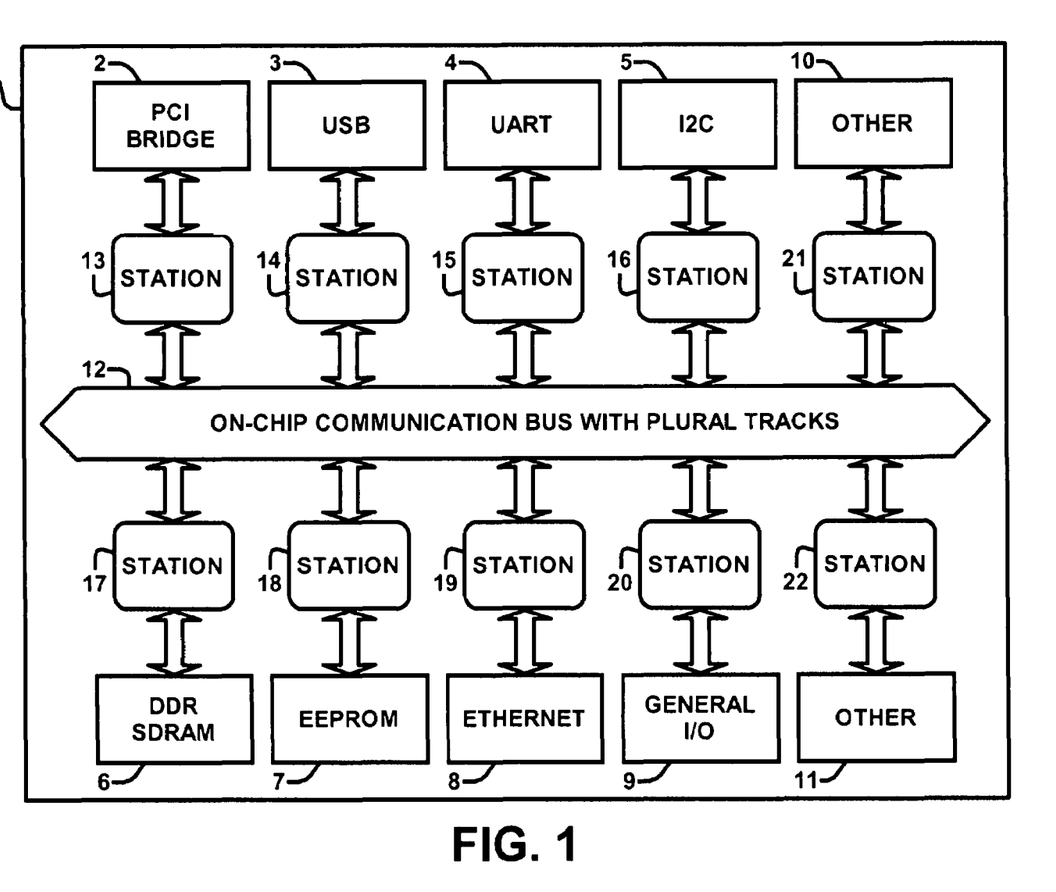
FIG. 1 shows an overview of an on-chip communication system according to the invention.

FIG. 1 shows an overview of an on-chip communication system according to the invention.

Chip 1 in FIG. 1 includes plural on-chip components that communicate using an on-chip communication system. The components in FIG. 1 are PCI bridge 2, USB interface 3, UART interface 4, I2C interface 5, DDR and SDRAM 6, EEPROM 7, Ethernet interface 8, general I/O interface 9, and other components 10 and 11. Each of these components is connected to on-chip communication bus 12 through stations 13 to 22, respectively. Thus, components 2 to 11 can communicate with each other through stations 13 to 22 and on-chip communication bus 12. The invention is not limited to the particular number and/or types of components shown in FIG. 1.

According to the invention, on-chip communication bus 12 includes plural tracks. These plural tracks allow more than one component to communicate with another component simultaneously.

Each track preferably includes lines for data bits and other control information. For example, one embodiment of a track includes lines for 64 bits of data, eight command/byte enable (C/BE) signals, two parity signals (one per double word of data), a start of packet signal, and an end of packet signal.

On-chip communication bus 12 preferably uses a packet based communication protocol. Use of such a protocol simplifies a chip designer's task in developing and/or modifying components to communicate through the on-chip communication bus and reduces the time that an initiator consumes for a given size data transfer. The underlying principle is that a station does not initiate a data transfer until it is ready to communicate quickly.

Station Design and Interconnection

Figure 2:
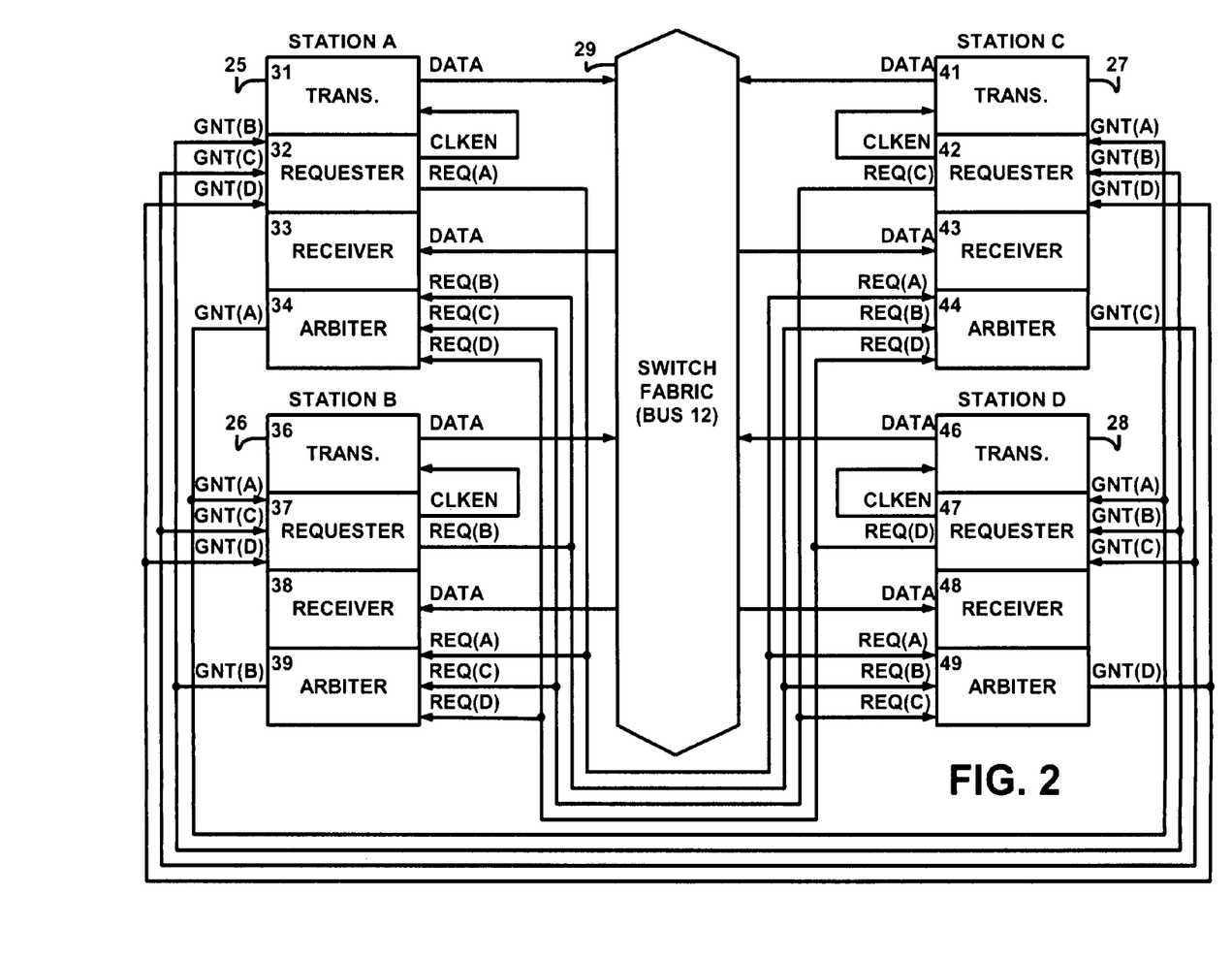
FIG. 2 illustrates one possible embodiment of an on-chip communication system according to the invention.

FIG. 2 illustrates one possible embodiment of an on-chip communication system according to the invention. FIG. 2 is a high-level diagram that shows the basic functionality used by stations according to the invention.

Briefly, a system for communication on a chip includes an on-chip communication bus including plural tracks, and a plurality of stations that couple a plurality of on-chip components to the on-chip communication bus. Each station has a dedicated track which it can use to send information to other stations.

In FIG. 2, stations 25 to 28 intercommunicate through switch fabric 29, which includes on-chip communication bus 12. Of course, the invention is not limited to four stations, and the stations need not be constructed and arranged as shown in FIG. 2.

Each of stations 25 to 28 is constructed similarly. Station A 25 includes transmitter 31, requester 32, receiver 33 and arbiter 34. Station B 26 includes transmitter 36, requester 37, receiver 38 and arbiter 39. Station C 27 includes transmitter 41, requester 42, receiver 43 and arbiter 44. Station D 28 includes transmitter 46, requester 47, receiver 48 and arbiter 49. While the transmitters, requesters, receivers and arbiters are shown as separate blocks in FIG. 2, these functions can be combined in a single circuit or block.

Transmitter 31 of station A 25 is responsible for transmitting data to switch fabric 29. In FIG. 2, clocking of data from transmitter 31 is enabled by requester 32 through a clock enable (CLKEN) signal.

Before requester 32 of station A 25 enables transmission of data, requester 32 sends a request (REQ) signal to each of the other stations connected to switch fabric 29. In a preferred embodiment of the invention, the request signals are multi-bit signals that incorporate different levels of priority for requests. For example, in a preferred embodiment, each request line is three bits wide to allow for seven different request priority levels (plus a no-request level of 000). When requester 32 receives a grant (GNT) signal from one of the other station in response to the request signal, requester 32 enables transmission of data from transmitter 31.

Station A 33 also can receive data, in particular through receiver 33. Arbiter 34 of station A 25 arbitrates and controls what data is sent to station A 25 from the other stations. Arbiter 34 performs this arbitration based on the priorities of request signals sent from the other stations. Arbiter 34 controls what data is sent to station A 25 by sending various grant signals in response to those request signals. This arrangement, in which a station can select what data is sent to that station, allows implementation of a split-response transaction model for communication over switch fabric 29.

Stations B 26 to D 28 operate similarly to station A 25.

The components connected each of the stations are not shown in FIG. 2. These components provide the data sent by the transmitters and receive the data received by the receivers. One or more such components can be connected to each station.

Other elements also can be included in the on-chip communication system according to the invention. For example, the system can include system registers for storing system parameters and a system controller for controlling system operation. These system registers and system controller preferably are connected to the on-chip communication system through their own station. The system also can include other special stations, watchdog circuits, and other elements.

Figure 3:
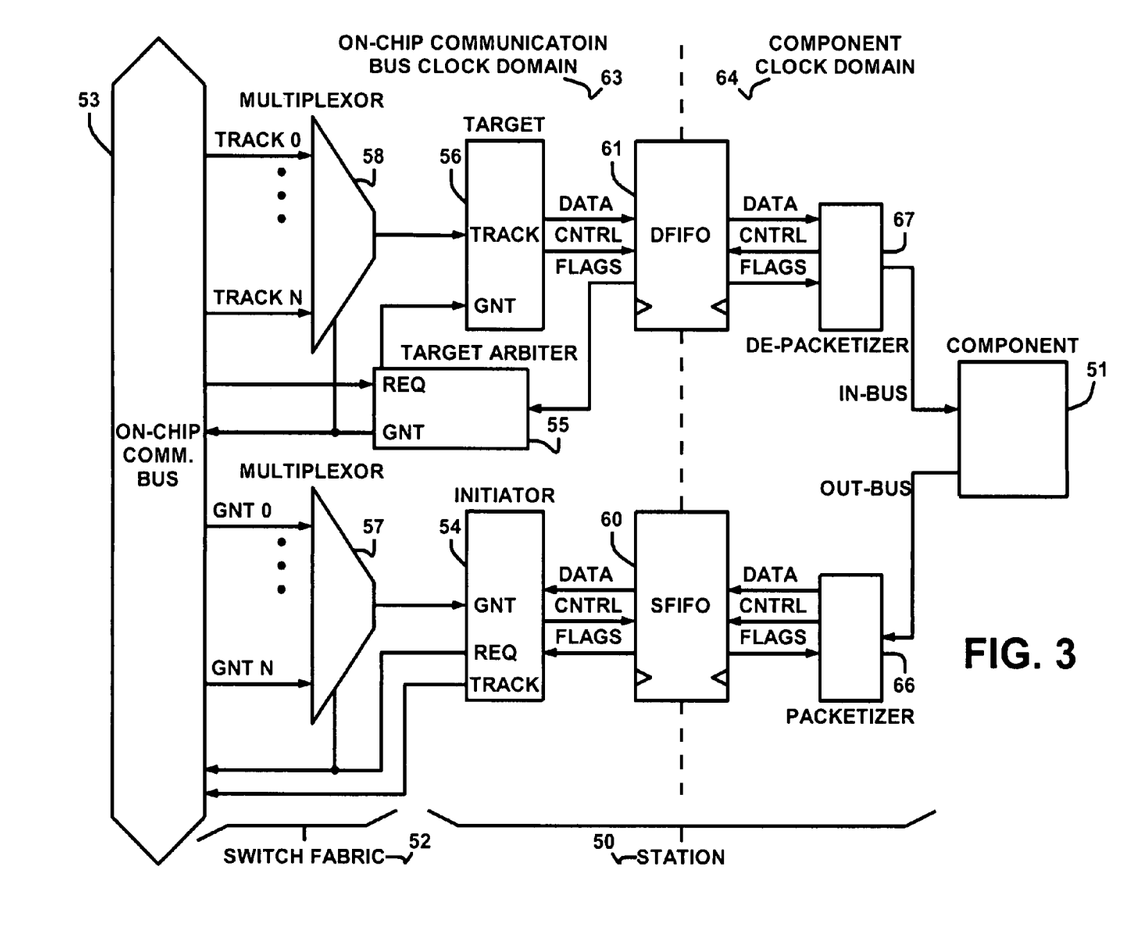
FIG. 3 illustrates one possible embodiment of a station for an on-chip communication system according to the invention.

FIG. 3 illustrates a preferred embodiment of a station for an on-chip communication system according to the invention.

In FIG. 3, station 50 connects component 51 to switch fabric 52, which includes on-chip communication bus 53 with plural tracks. Thus, in order for component 51 to communicate with other components across on-chip communication bus 53, component 51 transmits data to and receives data from station 50. Station 50 in turn communicates with other stations through switch fabric 52, and those stations communicate with their respective components.

Station 50 preferably includes initiator 54, target arbiter 55, and target 56. Initiator 54 requests permission to transmit outgoing data over a track to another station and transmits the outgoing data. Target arbiter 55 evaluates requests from other stations and selects a track on which to receive incoming data. Target 56 receives the incoming data.

Compared to the stations shown in FIG. 2, initiator 54 performs the functions of both a requester and a transmitter shown in FIG. 2. Target arbiter 55 performs the functions of an arbiter shown in FIG. 2. Target 56 performs the functions of a receiver shown in FIG. 2.

Returning to FIG. 3, initiator 54 is connected to multiplexor 57, which in turn is connected to on-chip communication bus 53. Likewise, target 56 is connected to multiplexor 58, which also is connected to on-chip communication bus 53.

The multiplexors for all stations connected to the on-chip communication bus along with the tracks of the bus form switch fabric 52, which preferably implements a crossbar switch. The switch fabric also can include other elements, as discussed in more detail with respect to FIG. 8. This switch fabric serves to switch data between stations over the tracks of on-chip communication bus 53. The switch fabric also can switch grant signals and other control data.

In order for the invention to utilize the plural tracks of on-chip communication bus 53, switch fabric 52 preferably is a multi-path switch fabric. In a preferred embodiment, this multi-path switch fabric is substantially equivalent to a cross-bar switch, except that the invention preferably utilizes arbitration based on request signals to determine switching as opposed to conventional scheduling.

Initiator 54 in FIG. 2 also is connected to source queue 60, and target arbiter 55 and target 56 are connected to destination queue 61. These queues preferably are first-in-first-out (FIFO) registers.

Queues 61 and 62 allow component 51 to operate in a different clock domain (i.e., using a different clock speed and/or clock) from the on-chip communication bus, and thus in a different clock domain from other components. FIG. 3 shows on-chip communication bus clock domain 63 on one side of queues 60 and 61, and component clock domain 64 on the other side of queues 60 and 61.

Different clock domains can be accommodated because data can be clocked into the queues at a different rate than the data is clocked out. This provides chip designers with greater flexibility in designing chips and integrating different components into those chips as compared to systems in which only one or a few clock domains can be accommodated.

Of course, the invention does not require that components run in different clock domains. Components can run in the same clock domain as the on-chip communication bus and/or each other, if so desired.

Source queue 60 is connected to packetizer 66, and destination queue 61 is connected to de-packetizer 67. The packetizer and de-packetizer allow component 51 to communicate with station 50 using a simplified packet-based protocol. Use of such a protocol simplifies the task of connecting a component to a station according to the invention, thereby reducing learning costs for chip designers using the invention.

A preferred embodiment of the packet protocol uses a 64 bit header and variable-sized payloads. Up to 32 payloads preferably can be sent with each header. The preferred embodiment of the header includes the following fields: station ID, report bit, long address bit, priority field, tag field, payload count, and address.

The station ID is 5 bits and identifies the source of the packet. It is assigned by the chip designer.

The report bit indicates whether or not a destination station should report to a source station with a completed without error message after completion of a data transfer or other command without an error.

The long address bit indicates that the first 24 bits of the first payload after the header contains additional address information.

The priority field holds a 3 bit priority level for the packet. This priority preferably matches the priority of the request signal sent for the packet.

The tag field is a 5 bit field used to uniquely identify split-response transaction requests. These types of requests are used in read operation, as discussed in more detail below with reference to FIG. 7.

The payload count contains 9 bits that indicate how many packets of payload are associated with and will follow the header.

The address field stores a 40 bit address for the data. This address preferably is with respect to an address space assigned to the station, and thereby to the component(s) connected to the station.

Other arrangements for a station, component, switch fabric and packet layout are possible and also fall within the scope of the invention.

Figure 4:
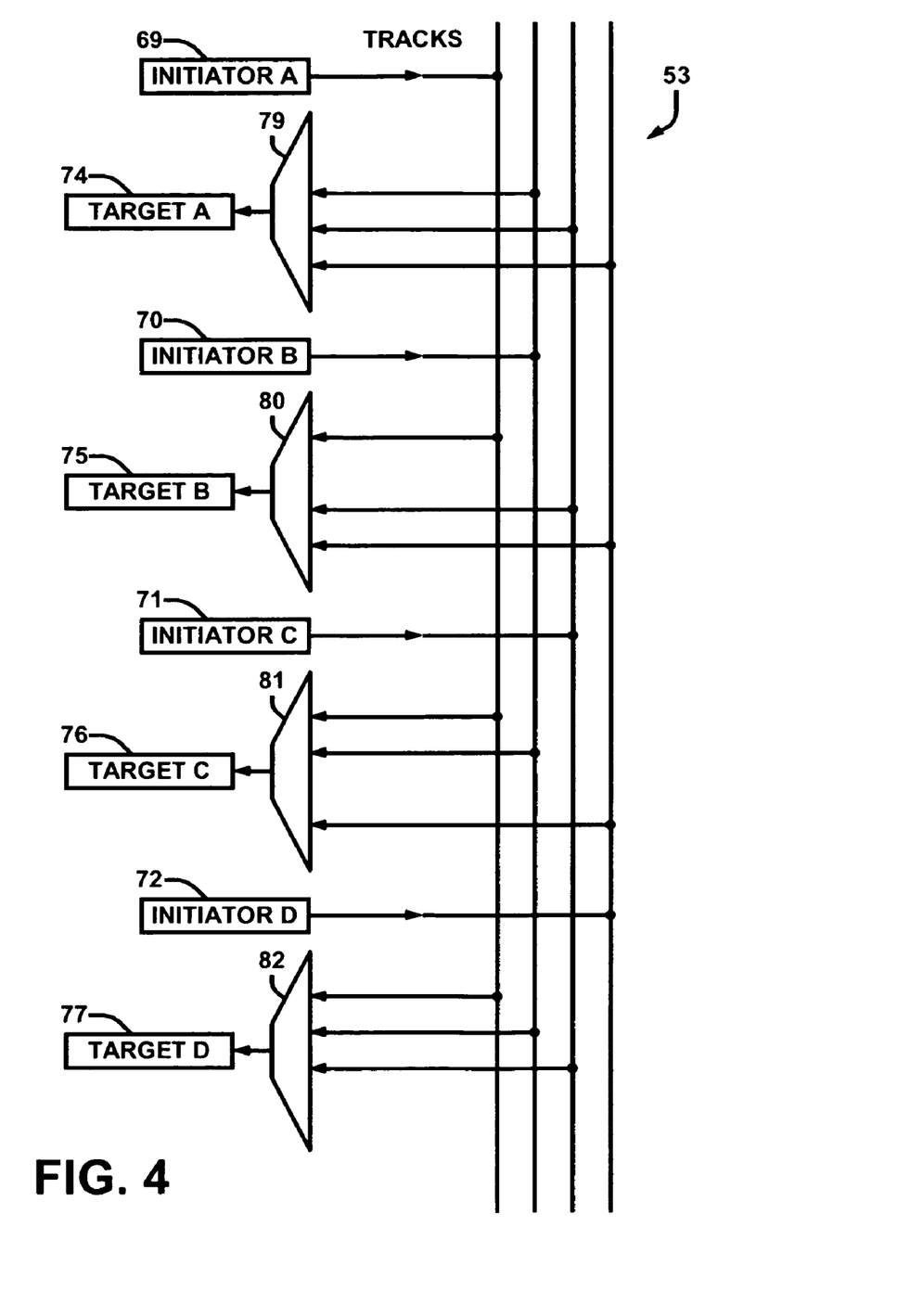
FIG. 4 illustrates one possible arrangement for interconnecting track lines for stations according to the invention.

FIG. 4 illustrates one possible arrangement for interconnecting track lines for stations according to the invention.

In FIG. 4, initiators 69 to 72 are connected to targets 74 to 77 through multiplexors 79 to 82. The initiators, targets and multiplexors are connected such that data sent over a track from an initiator at any station can be received by a target at any other station. The multiplexors in FIG. 4 correspond to multiplexor 58 in FIG. 3. Thus, when a station's target arbiter sends a grant signal to another station, that target arbiter uses the station's track multiplexor to select the corresponding track for receiving data from the other station.

Figure 5:
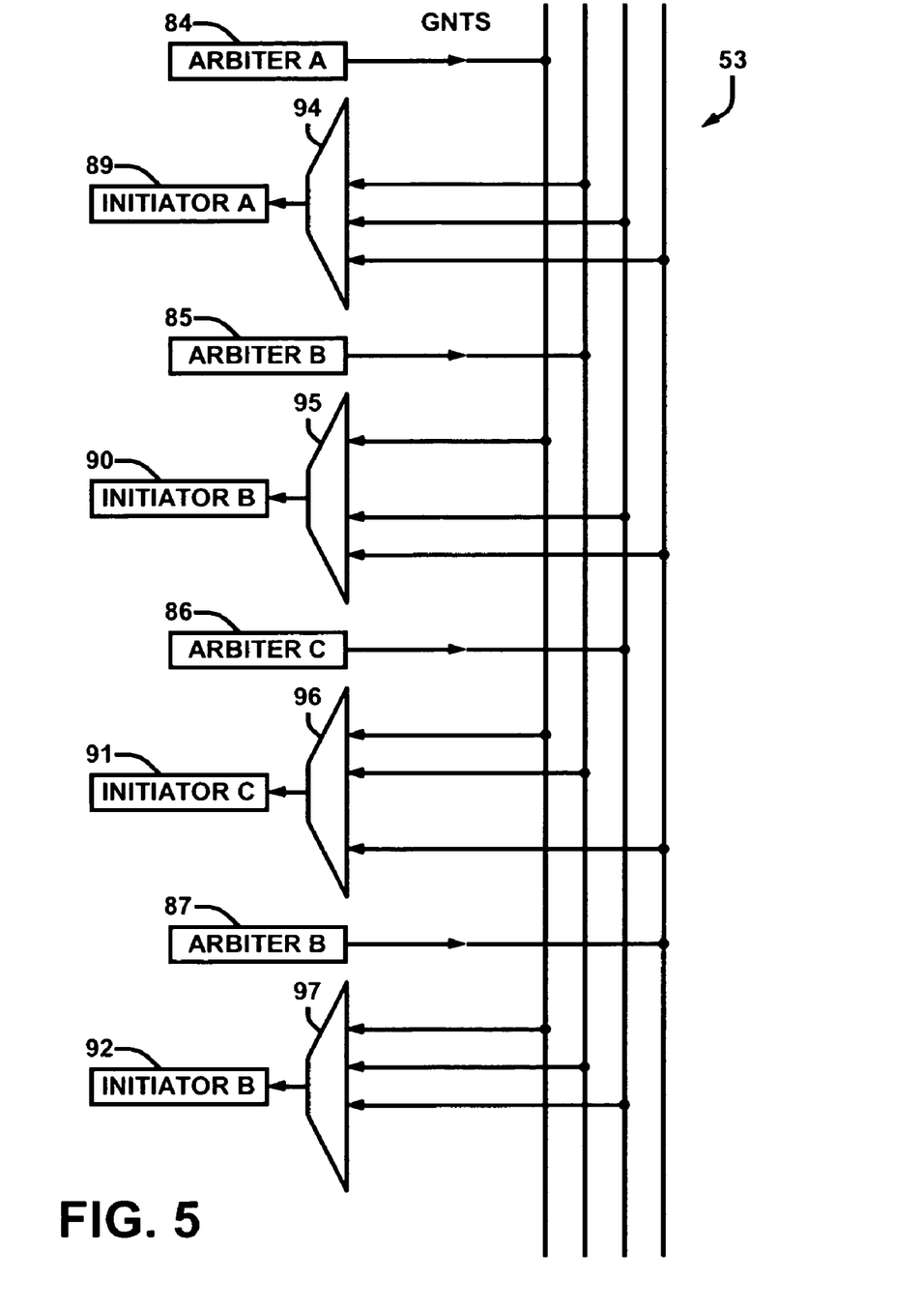
FIG. 5 illustrates one possible arrangement for interconnecting grant lines for stations according to the invention.

FIG. 5 illustrates one possible arrangement for interconnecting grant lines for stations according to the invention.

In FIG. 5, target arbiters 84 to 87 are connected to initiators 89 to 92 through multiplexors 84 to 97. The target arbiters, initiators and multiplexors are connected such that grant signals sent from an arbiter at any station can be received by an initiator at any other station. The multiplexors in FIG. 5 correspond to multiplexor 57 in FIG. 3. Thus, when a station's initiator sends a request signal to another station, that initiator uses the station's grant multiplexor to select the corresponding grant line from the target arbiter for the other station. The requesting station can then monitor that grant line for a grant signal from the other station.

The request lines preferably are not connected to the stations through multiplexors. Instead, the request line(s) from each station's initiator preferably are directly connected to each other station's target arbiter. Each station's target arbiter preferably is directly connected to all request lines from all other stations. For example, if there are four stations, each station's target arbiter preferably is connected to the three sets of request lines from each of the other stations. This arrangement allows stations to receive and to react extremely quickly to request signals from other stations.

Station Sharing

Figure 6:
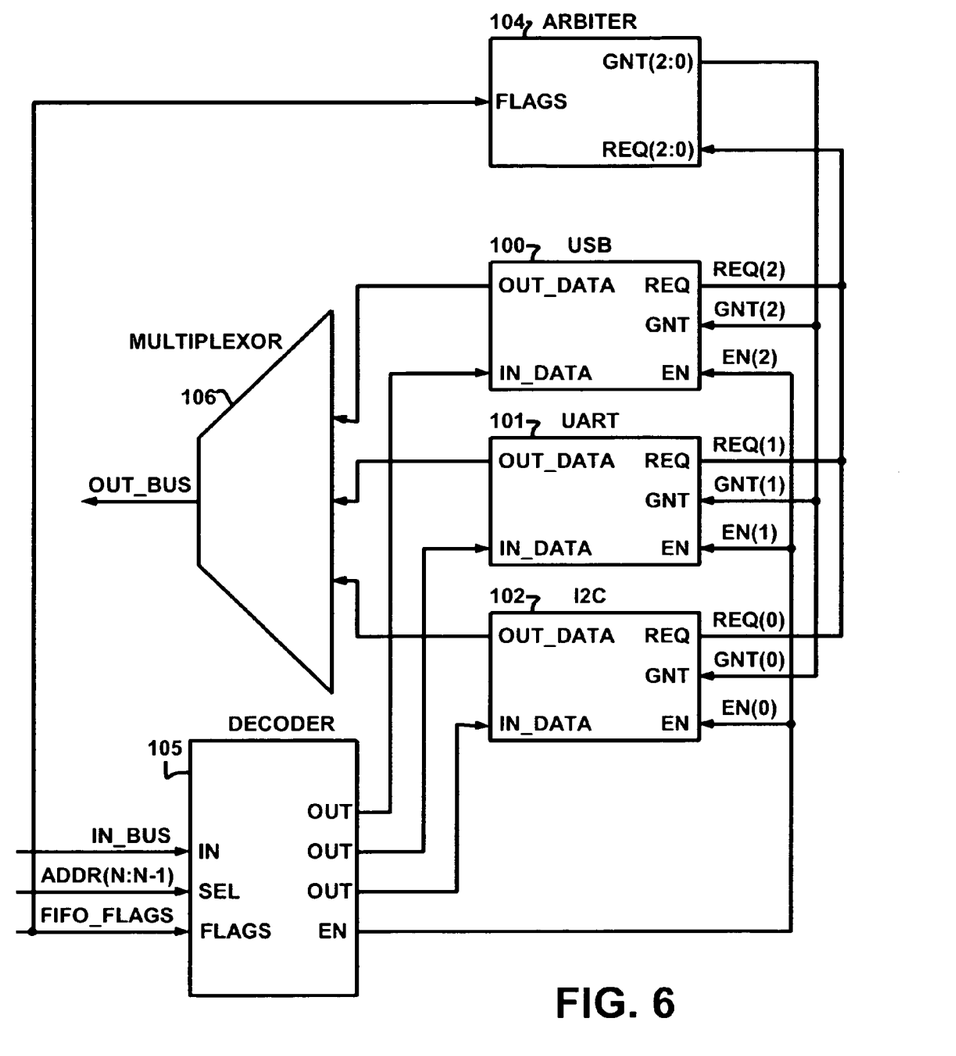
FIG. 6 illustrates one possible arrangement for plural on-chip components to share a single station according to the invention.

FIG. 6 illustrates one possible arrangement for plural on-chip components to share a single station according to the invention. This arrangement is particularly useful when several components are relatively slow compared to other components and/or to the on-chip communication system.

In FIG. 6, three components 100 to 102 share a station. These components are illustrated as USB interface 100, UART interface 101, and I2C interface 102. Of course, the invention is not limited to these particular components or to three components sharing a station. More or fewer components can share a station according to the invention.

As shown in FIG. 6, an additional arbiter 104, decoder 105 and multiplexor 106 are used to connect the plural components to a station. Comparing FIGS. 3 and 6, all of the elements in FIG. 6 take the place of component 51 in FIG. 3, with additional signals provided for address and flag information.

Arbiter 104 in FIG. 6 further arbitrates grants and requests among the sharing components. Decoder 105 decodes address and flag information so as to route incoming data to the appropriate component. Multiplexor 106 likewise selects outgoing data from the appropriate one of the components.

Other arrangements for sharing a station are possible and also fall within the scope of the invention. In any case, sharing of a station by plural components conserves memory and routing resources.

Split-Response Transaction Model

The invention utilizes a split-response transaction model of communication. A write operation from one station to another is simple in this model. A first station requests permission to write to a second station. If the second station is available and has room in its incoming packet buffer, the second station grants the request. Then, the first station sends a write command to the second station, followed by the data.

A read operation is slightly more complicated because a station preferably needs to make data available before it can be returned to the requesting station. In order to perform a read operation, a first station again requests permission to send a read request to a second station. However, instead of sending data, the first station sends a read request command. This command preferably includes address information for the data to be read.

The second station responds to the read request command by initiating a read completion operation to write the requested data to the first station. This read completion operation is substantially identical to a write operation from the second station to the first station, except that the second station indicates that the operation is a read completion. The second station preferably makes this indication through the bus command portion of the track used to send the data for the read operation.

The two-stage read operation is called a "split-response transaction" operation because the operation is split over two transactions: a read request and a read completion. The tag field in the header for any packets sent in response to a read request is used to align those packets with the read request. In other words, the tag field is used to align a read request and the resulting data across the split-response transaction.

Using the foregoing approach, all operations between stations involve transmitting information from one station to another station for consumption. For a write, the information includes a write command and the actual data to be written. For a read request, the information includes a read request command and address information. For a read completion, the information includes the data that was requested by the corresponding read request command, along with an indicator that the data is for a read completion command.

Transmitting Information

Figure 7:
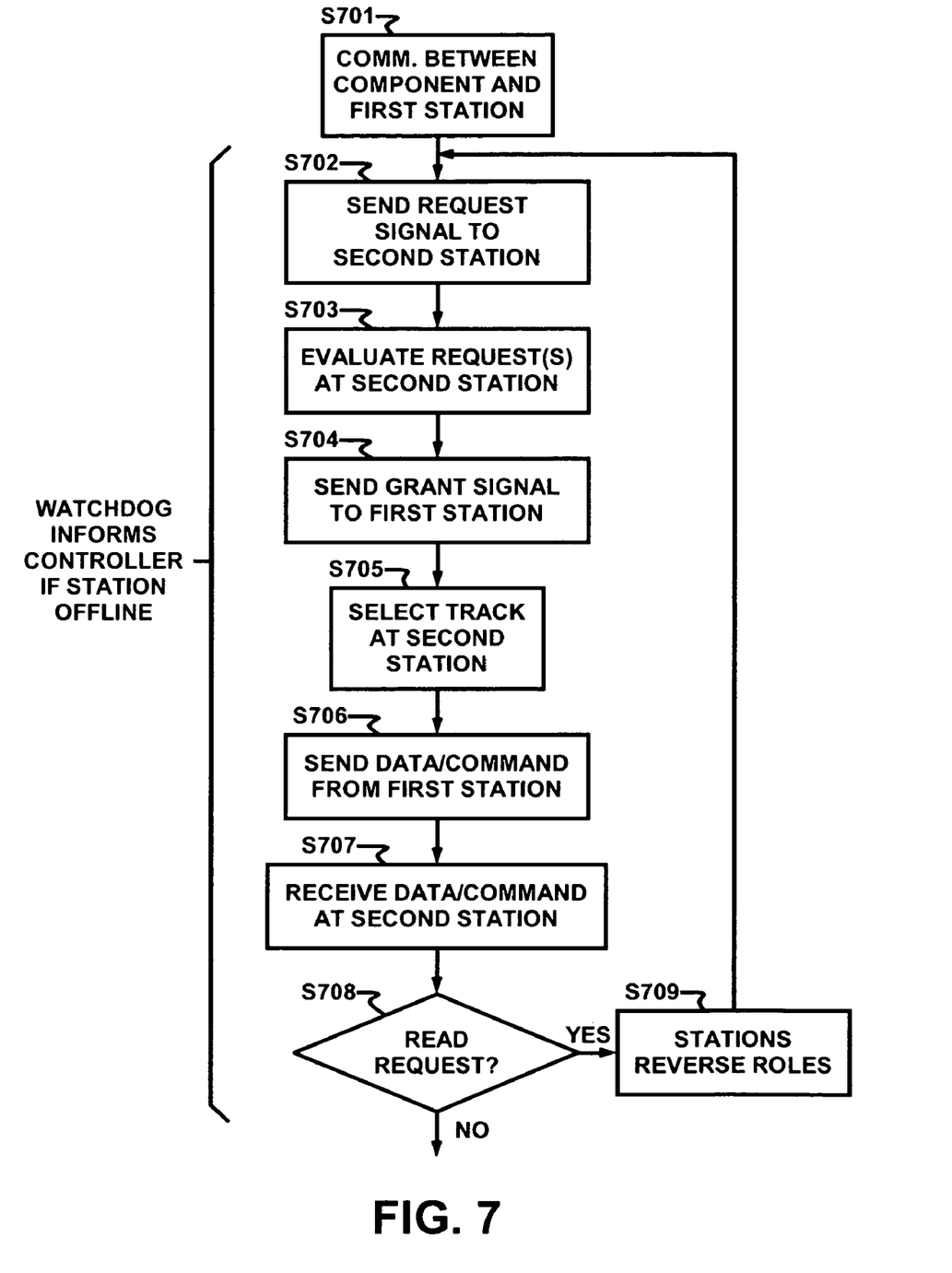
FIG. 7 is a flowchart for explaining communication between components across an on-chip communication system according to the invention.

FIG. 7 is a flowchart for explaining communication between components across an on-chip communication system according to the invention. The steps in FIG. 7 are discussed with reference to the elements of the station depicted in FIG. 3 in order to improve understanding of the invention. However, the method illustrated by FIG. 7 is not limited to use with the station shown in FIG. 3.

In step S701, a component communicates with its station to request a data transfer over the on-chip communication bus with another component connected to another station. This data transfer could be a write operation or a read operation. The first and second stations communicate with each other to accomplish the data transfer in steps S702 to S709.

In step S702, the first station's initiator sends a request signal to the second station in step S702. This request is received by the second station's target arbiter.

As discussed above, the request signal preferably indicates a priority for the data transfer. Write operations preferably are assigned higher priorities than read operations. Thus, when requests are evaluated by the second station's target arbiter, writes can be executed before any pending reads. This priority scheme facilitates use of the split-response transaction model for communication between components. Without this priority scheme, a station could choose to read (i.e., consume) data before an earlier-issued write was completed, possibly causing the station to inadvertently read stale or inaccurate data.

In step S703, the second station's target arbiter evaluates all outstanding requests from other stations, including the request from the first station. The target arbiter preferably selects the request with the highest priority.

In order to grant the first station's request, the second station's target arbiter sends a grant signal to the first station in step S704. In step S705, the second station selects a track for the data. In actual operation, steps S704 and S705 preferably occur simultaneously by sending a grant signal from the second station's target arbiter to both the first station and to a track multiplexor in the second station.

In response to the grant signal, the first station's initiator sends a command and/or data to the second station in step S706. The command preferably is sent using the command/byte enable signal lines of the selected track. Commands include, but are not limited to, write commands, read request commands, and read completion commands. The data preferably is sent using the 64 data lines in the selected track.

In step S707, the target at the second station receives the command and/or data. Then, if the command is a read request, flow proceeds from step S707 through step S708 to step S709. In step S709, the first and second stations reverse roles, and the station that received the read request initiates a read completion command to send the data.

Other Operations

The on-chip communication system according to the invention also preferably can execute register read and write operations for reading and writing to system registers. Because these system registers preferably also are connected to the on-chip communication system through a station, the process of reading and writing to the system registers is similar to that discussed above. Additionally, the system preferably can execute special I/O commands, system control commands (e.g., initialize, abort, etc.), and the like. System commands preferably are directed toward a system controller connected to the system through a station.

The invention also can accommodate special direct memory access operations among stations. These operations involve a special direct memory access station that is beyond the scope of this disclosure. However, such stations can be connected to the on-chip communication system disclosed herein without departing from the foregoing teachings.

Head-of-Line Blocking

Head-of-line blocking occurs when transmission of data at the front of a source queue is delayed because it is intended for a station or component that is busy, thereby blocking transmission of data deeper in the source queue that is intended for a station or component that is not busy. This type of blocking can greatly impact communication in a system.

The invention addresses head-of-line blocking in at least three ways: through use of "tracks" that typically have twice as much bandwidth as is required by the source or destination of the data, through use of a packet-based communication protocol, and through use of a watchdog circuit.

The on-chip communication system according to the invention can be very fast. Thus, any blocking that occurs is not likely to last long. This strength is enhanced by the system's ability to use a different clock domain for the communication bus than the components connected to the system. As a result, the on-chip communication system can operate at a higher clock speed than the components, further reducing the impact of any blocking. It is well known that head of line blocking limits throughput to roughly 59% of the peak speed of the interconnect. By having a 2:1 overspeed in the interconnect, we allow sources and destinations to achieve their full data rate despite head of line blocking.

The packet-based protocol used by the invention preferably limits how many payloads and the length of each payload that can be sent in response to a grant of a request to send data. As a result, no one data transfer operation is likely to tie up a station for too long, thereby reducing the length of any blocking that does occur.

The on-chip communication system according to the invention also can include one or more watchdog circuits. Preferably, one watchdog circuit is provided for each station. These circuits can monitor the stations of the system to see if any station stalls or goes offline for more than a predetermined amount of time (e.g., ½ second). Preferably, the value for this amount of time is stored in a system register for the on-chip communication system.

If a station stalls or goes offline for more than the predetermined amount of time, that station's watchdog timer can inform a controller for the communication system. The controller can then instruct all stations to purge any pending or queued operations involving the offline or stalled station or to reroute those operations. Thus, if blocking occurs because of an offline or stalled station, the blocking is terminated after the predetermined amount of time.

Scalability

The on-chip communication system according to the invention is scalable to large systems. This scalability is possible because relatively few components are required to interface each component to the system. Scalability also is facilitated by the ability of a station to interface plural components to the system.

However, a problem does exist in that as the number of stations increases, the size of the grant and track multiplexors also increases. This increase is not linear. Instead, the size of the multiplexors increases by increasing amounts for each additional station. The increase is of order $N^2$, where N is the number of stations. At some point, if conventional multiplexor circuitry is used, the footprint of the multiplexors on the chip can become too large and unwieldy to place on the chip.

The invention addresses the foregoing issue by constructing the multiplexors from smaller multiplexors and other circuits distributed across the chip. The stations are interconnected using these smaller multiplexors, thereby alleviating the problem of having to place large multiplexor circuits at one place for each station on the chip.

Figure 8:
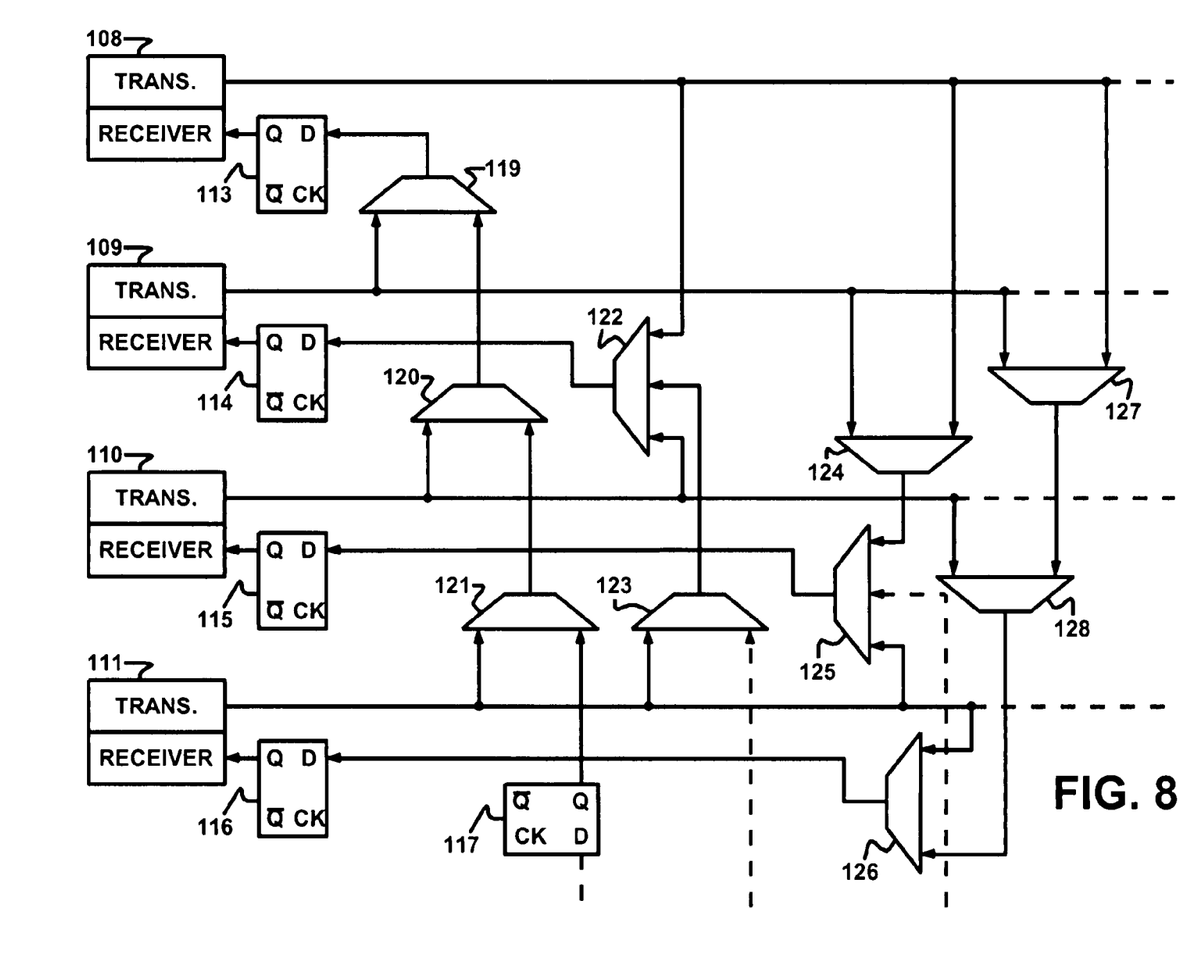
FIG. 8 illustrates a technique for interconnecting stations using smaller multiplexors to improve scalability according to the invention.

FIG. 8 illustrates a technique for interconnecting stations using smaller multiplexors to improve scalability according to the invention. The invention also includes the use of pipeline storage elements—D flip-flops—between some of the multiplexor stages in order to maintain transmission speed when a track must traverse a large number of multiplexor stages. The invention also includes adjusting the time of issuance of a grant to a new transmitting station relative to the end of transmission of a current transmitting station according to the number and location of pipeline storage elements traversed by the track in the switch fabric in order to eliminate idle cycles between the end of a transmission and the start of a next, waiting transmission.

In FIG. 8, transmitters/receivers 108 to 111 are interconnected through a switch fabric including D flip-flops 113 to 117 and small multiplexors 119 to 126. In this case, the term "small" is in comparison to larger multiplexors that would be needed using conventional circuitry.

The dashed lines in FIG. 8 illustrate connections that could be made to accommodate more stations. Advantageously, no additional space need be used near the existing stations. As a result, scalability is improved.

ALTERNATIVE EMBODIMENTS

Although preferred embodiments of the invention are disclosed herein, many variations are possible which remain within the content, scope and spirit of the invention, and these variations would become clear to those skilled in the art after perusal of this application.

What is claimed is:

1. A system for communication on a chip, comprising:
   an on-chip communication bus including plural tracks; and
   a plurality of stations that couple a plurality of on-chip components to the on-chip communication bus;
   wherein each station has a dedicated track which it can use to send information to other stations; and a first on-chip component of the plurality of on-chip components and a second on-chip component of the plurality of on-chip components are coupled to the on-chip communication bus through one of the stations; wherein each station includes: an initiator that requests permission to transmit outgoing data over a track to another station and that transmits the outgoing data; an arbiter that evaluates requests from other stations and selects a track on which to receive incoming data; and a target that receives the incoming data.

2. A system as in claim 1, wherein the stations use a packet based communication protocol.

3. A system as in claim 1, wherein the on-chip components include a PCI bridge, a USB component, or an inter-integrated-circuit component.

4. A system as in claim 1, wherein the initiator is connected to a grant multiplexor for selecting a grant line.

5. A system as in claim 4, wherein the grant multiplexor further comprises plural smaller multiplexors distributed across the chip to facilitate scalability.

6. A system as in claim 1, wherein the arbiter is connected to a track multiplexor for selecting a track.

7. A system as in claim 6, wherein the track multiplexor further comprises plural smaller multiplexors distributed across the chip to facilitate scalability.

8. A system as in claim 1, wherein each station further comprises a source queue for queuing outgoing data.

9. A system as in claim 8, wherein the source queue is a first-in-first-out register.

10. A system as in claim 1, wherein each station further comprises a destination queue for queuing incoming data.

11. A system as in claim 10, wherein the destination queue is a first-in-first-out register.

12. A system as in claim 1, wherein each station further comprises:
   a source queue for queuing outgoing data, and a destination queue for queuing incoming data.

13. A system as in claim 12, wherein the source queue and the destination queue serve to separate a first clock domain for the on-chip communication bus from a second clock domain for one of the plurality of on-chip components.

14. A system as in claim 1, wherein the first and the second on-chip components are selected from a group consisting of a peripheral component interconnect (PCI) bridge, a universal serial bus (USB) interface, an inter-integrated-circuit (I2C) interface, a universal asynchronous receiver transmitter (UART) interface, a data direction register (DDR), a synchronous dynamic access memory (SDRAM), an ethernet interface, and a general input/output (I/O) interface.

15. A system as in claim 1, wherein the stations comprise multiplexors that further comprise:
   smaller multiplexors distributed across the chip in stages to facilitate scalability;
   pipeline storage elements between some of the stages in order to maintain transmission speed when a track must traverse a large number of stages.

16. A system as in claim 1, wherein each station comprises a watchdog circuit that determines if its station has gone offline.

17. A system as in claim 16, wherein if the watchdog circuit determines that its station has gone offline, that watchdog circuit informs a controller connected to the system.

18. A method for communication on a chip, comprising the steps of:
   communicating between a plurality of on-chip components and a plurality of stations coupled to the plurality of on-chip components; and
   communicating between the plurality of stations using an on-chip communication bus including a plurality of tracks;
   wherein each station has a dedicated track which it can use to send information to other stations, and a first on-chip component of the plurality of on-chip components and a second on-chip component of the plurality of on-chip components are coupled to the on-chip communication bus through one of the stations;
   wherein the step of communicating between the plurality of stations further comprises the steps of: sending a request from a first station to a second station; evaluating the request at the second station; sending a grant signal from the second station to the first station; selecting a track at the second station; sending a data or command from the first station to the second station; and receiving the data or command at the second station.

19. A method as in claim 18, wherein the stations use a packet based communication protocol.

20. A method as in claim 18, wherein the on-chip components include a PCI bridge, a USB component, or an inter-integrated-circuit component.

21. A method as in claim 19, wherein
   sending the request is performed by an initiator at the first station;
   evaluating the request is performed by an arbiter at the second station;
   sending the grant signal is performed by the arbiter at the second station;
   selecting the track is performed by the arbiter at the second station;
   sending the data or command is performed by the initiator at the first station; and
   receiving the data is performed by a target at the second station.

22. A method as in claim 21, wherein the initiator is connected to a grant multiplexor for selecting a grant line.

23. A method as in claim 22, wherein the grant multiplexor comprises plural smaller multiplexors distributed across the chip to facilitate scalability.

24. A method as in claim 21, wherein the arbiter is connected to a track multiplexor for selecting a track.

25. A method as in claim 24, wherein the track multiplexor comprises plural smaller multiplexors distributed across the chip to facilitate scalability.

26. A method as in claim 21, wherein each station further comprises a source queue for queuing outgoing data.

27. A method as in claim 26, wherein the source queue is a first-in-first-out register.

28. A method as in claim 21, wherein each station further comprises a destination queue for queuing incoming data.

29. A method as in claim 28, wherein the destination queue is a first-in-first-out register.

30. A method as in claim 21, wherein each station further comprises:
a source queue for queuing outgoing data, and
a destination queue for queuing incoming data.

31. A method as in claim 30, wherein the source queue and the destination queue serve to separate a first clock domain for the on-chip communication bus from a second clock domain for one of the plurality of on-chip components.

32. A method as in claim 18, wherein the first and the second on-chip components are selected from a group consisting of a peripheral component interconnect (PCI) bridge, a universal serial bus (USB) interface, an inter-integrated-circuit (I2C) interface, a universal asynchronous receiver transmitter (UART) interface, a data direction register (DDR), a synchronous dynamic access memory (SDRAM), an ethernet interface, and a general input/output (I/O) interface.

33. A method as in claim 18, wherein the stations comprise multiplexors that further comprise smaller multiplexors distributed across the chip in stages to facilitate scalability, and pipeline storage elements between some of the stages in order to maintain transmission speed when a track must traverse a large number of stages.

34. A method as in claim 18, further comprising the step of determining if a station has gone offline, the step of determining performed by a watchdog circuit for the station.

35. A method as in claim 34, further comprising the step of informing a controller if the watchdog circuit determines that its station has gone offline.

36. A system for communication on a chip, comprising:
means for communicating between a plurality of on-chip components and a plurality of stations coupled to the plurality of on-chip components; and
means for communicating between the plurality of stations using an on-chip communication bus including a plurality of tracks;
wherein each station has a dedicated track which it can use to send information to other stations, and a first on-chip component of the plurality of on-chip components and a second on-chip component of the plurality of on-chip components are coupled to the on-chip communication bus through one of the stations.

37. A system as in claim 1, wherein each station comprises a requester circuit capable of sending a request signal requesting grant of use of one of the dedicated tracks for communication with other stations, wherein the request signal incorporates one of a plurality of priority levels.

38. A system for communication on a chip, comprising: an on-chip communication bus including plural tracks; and a plurality of stations that couple a plurality of on-chip components to the on-chip communication bus; wherein each station has a dedicated track which it can use to send information to other stations; and a first on-chip component of the plurality of on-chip components and a second on-chip component of the plurality of on-chip components are coupled to the on-chip communication bus through one of the stations; wherein each station includes an arbiter circuit capable of receiving a request signal and granting permission to a station that originated the request signal to send information to the station that granted permission over the dedicated track of the station that originated the request signal.

39. A system as in claim 38, wherein the request signal incorporates a request priority level, and the arbiter circuit is capable of granting permission based on the request priority level.

40. A system as in claim 38, wherein the arbiter circuit is directly connected to at least a subset of the plurality of stations to receive request signals from the stations of the subset, the subset comprising the station that originated the request signal.

* * * * *